(12) United States Patent
Alomair et al.

(10) Patent No.: US 11,779,907 B2
(45) Date of Patent: Oct. 10, 2023

(54) METHOD FOR MAKING A GOLD/ZINC/GRAPHENE OXIDE PHOTOCATALYST COMPOSITE

(71) Applicant: Imam Abdulrahman Bin Faisal University, Dammam (SA)

(72) Inventors: Nuhad Abdullah Alomair, Dammam (SA); Hanan Hussein Amin Mohamed, Dammam (SA)

(73) Assignee: Imam Abdulrahman Bin Faisal University, Dammam (SA)

(*) Notice: Subject to any disclaimer, the term of this patent is extended or adjusted under 35 U.S.C. 154(b) by 0 days.

(21) Appl. No.: 18/318,763

(22) Filed: May 17, 2023

(65) Prior Publication Data

US 2023/0285943 A1 Sep. 14, 2023

Related U.S. Application Data

(60) Continuation of application No. 17/700,969, filed on Mar. 22, 2022, now Pat. No. 11,707,734, which is a division of application No. 16/437,614, filed on Jun. 11, 2019, now Pat. No. 11,305,262.

(51) Int. Cl.
| | |
|---|---|
| *B01J 23/89* | (2006.01) |
| *C02F 1/72* | (2023.01) |
| *B01J 35/10* | (2006.01) |
| *B01J 35/00* | (2006.01) |
| *B01J 21/18* | (2006.01) |
| *C02F 101/30* | (2006.01) |

(52) U.S. Cl.
CPC ............ *B01J 23/8953* (2013.01); *B01J 21/18* (2013.01); *B01J 35/004* (2013.01); *B01J 35/1061* (2013.01); *C02F 1/725* (2013.01); *C02F 2101/308* (2013.01)

(58) Field of Classification Search
CPC ...... B01J 23/8953; B01J 21/18; B01J 35/004; B01J 35/1061; C02F 1/725; C02F 2101/308
USPC .......................................................... 502/343
See application file for complete search history.

(56) References Cited

U.S. PATENT DOCUMENTS

| | | | |
|---|---|---|---|
| 2015/0202598 A1 | 7/2015 | Kallesoe | |
| 2019/0047856 A1 | 2/2019 | Nadeem | |

FOREIGN PATENT DOCUMENTS

| | | | |
|---|---|---|---|
| CN | 103920442 A | 7/2014 | |
| CN | 103991921 A | 8/2014 | |
| CN | 106582717 A | 4/2017 | |

(Continued)

OTHER PUBLICATIONS

Yao et al.; Green synthesis of silver nanoparticles using grape seed extract and their application for reductive catalysis of Direct Orange 26:, Journal of Industrial and Engineering Chemistry 58 (2018) 74-79. (Year 2019).

(Continued)

*Primary Examiner* — Anita Nassiri-Motlagh
(74) *Attorney, Agent, or Firm* — Oblon, McClelland, Maier & Neustadt, L.L.P.

(57) ABSTRACT

An efficient photocatalyst nanocomposite comprising reduced graphene oxide, noble metal, and a metal oxide prepared by a one-step method that utilizes date seed extract as a reducing and nanoparticle determining size agent. The photocatalyst of the invention is a more effective sunlight photocatalyst than that prepared by traditional method in the photo decomposition of organic compounds in contaminated water.

3 Claims, 18 Drawing Sheets

(56) References Cited

FOREIGN PATENT DOCUMENTS

| CN | 108479756 A | 9/2018 |
| CN | 106311196 B | 1/2019 |
| KR | 10-1453391 | 10/2014 |
| WO | WO2019022268 A1 | 1/2019 |

OTHER PUBLICATIONS

WO-2019022268A1 English Translation (Year: 2019).
Soliman, et al. ; Photocatalytic activity of transition metal ions-loaded activated carbon: Degradation of crystal violet dye under solar radiation ; Journal of Water Process Engineering 17 ; pp. 245-255 | 2017 ; 12 Pages.
Zayed, et al. ; *Phoenix dactylifera* L. leaf extract phytosynthesized gold nanoparticles; controlled synthesis and catalytic activity ; Spectrochimica Acta Part A: Molecular and Biomolecular Spectroscopy vol. 121 ; pp. 238-244 ; Mar. 5, 2014 ; Abstract Only ; 2 Pages.
Lee, et al. ; Fabrication of Au/GO/ZnO composite nanostructures with excellent photocatalytic performance Materials Chemistry Physics ; pp. 1-7 ; Aug. 9, 2015 ; 8 Pages.
Blaisi, et al. ; Date palm ash-MgAl-layered double hydroxide composite: sustainable adsorbent for effective removal of methyl orange and eriochrome black-T from aqueous phase ; Environmental Science and Pollution Research ; Sep. 27, 2018 ; 14 Pages.

Flavan 3-ol

Gallic Acid p-Coumaric Acid

2-Hydroxycinnamic acid

METHOD FOR MAKING A GOLD/ZINC/GRAPHENE OXIDE PHOTOCATALYST COMPOSITE

CROSS-REFERENCE TO RELATED APPLICATIONS

The present application is a Continuation of U.S. application Ser. No. 17/700,969, now allowed, having a filing date of Mar. 22, 2022 which is a Divisional of U.S. application Ser. No. 16/437,614, now U.S. Pat. No. 11,305,262, having a filing date of Jun. 11, 2019.

BACKGROUND OF THE INVENTION

Field of the Invention

The invention pertains to methods for green synthesis of photocatalyst nanocomposites comprising a noble metal, a metal oxide, and reduced graphene oxide, compositions containing the photocatalyst nanocomposites, heterojunction structures based on the photocatalyst nanocomposites, and methods of purifying water using the photocatalyst nanocomposites to remove soluble organic contaminants in combination with sunlight.

Description of Related Art

The "background" description provided herein is for the purpose of generally presenting the context of the disclosure. All references cited herein are incorporated by reference. Work of the presently named inventors, to the extent it is described in this background section, as well as aspects of the description which may not otherwise qualify as prior art at the time of filing, are neither expressly or impliedly admitted as prior art against the present disclosure.

Zinc oxide nanostructures have several properties making them promising materials for use in several advanced technologies and applications [Mir et al. "Preparation of ZnO NanoFlowers and Zn Glycerolate Nanoplates Using Inorganic Precursors via a Convenient Rout and Application in Dye Sensitized Solar Cells" Chem. Eng. J. 181 (2012) 779-89; Salavati-Niasari et al. "Preparation of ZnO Nanoparticles from [bis(acetylacetonato)zinc(II)]-oleylamine Complex by Thermal Decomposition" Mater. Lett. 62 (2008) 1890-1892; Mohamed, H. H. "Sonochemical synthesis of ZnO hollow microstructure/reduced graphene oxide for enhanced sunlight photocatalytic degradation of organic pollutants" J. Photochem. Photobiol. A 353 (2018) 401-408; Salavati-Niasari et al. "Nanosphericals and Nanobundles of ZnO: Synthesis and Characterization" J. Alloys Compd. 509 (2011) 61-65; and Salavati-Niasari et al. "Synthesis and Characterization of ZnO Nanocrystals from Thermolysis of New Precursor" Chem. Eng. J. 146 (2009) 498-502]. Both physical and chemical methods have been developed for the preparation of ZnO nanoparticles [Jamal et al. "Optical Properties of Nanostructured ZnO Prepared by a Pulsed Laser Deposition Technique" Mater. Lett. 132 (2014) 31-33; Djurišić et al. "Optical Properties of ZnO Nanostructures" Small 2 (2006) 944-961; Ogata et al. "Control of Chemical Bonding of the ZnO Surface Grown by Molecular Beam Epitaxy" Appl. Surf Sci. 237 (2004) 348-351; and Zhao et al. "Ferromagnetic ZnO Nanoparticles Prepared by Pulsed Laser Deposition in Liquid" Mater Lett. 85 (2012) 164-167]. Precipitation, hydrolysis, pyrolysis, hydrothermal, sol-gel, and sonochemical are some of the chemical methodologies used for the synthesis of ZnO nanoparticles having various sizes and morphologies [Debanath et al. "Study of Blueshift of Optical BandGap in Zinc Oxide (ZnO) Nanoparticles Prepared by Low-Temperature Wet Chemical Method" Mater. Lett. 111 (2013) 116-119; Li et al. "One-Step, Solid-State Reaction to ZnO Nanoparticles in the Presence of Ionic Liquid" Mater. Sci. Semicond. Process. 14 (2011) 184-187; Raja et al. "Synthesis, Structural and Optical Properties of ZnO and Ni-Doped ZnO Hexagonal Nanorods by Co-Precipitation Method" Spectrochim. Acta Part A Mol. Biomol. Spectrosc. 120 (2014) 19-24; Kuan et al. "ZnO Morphology Development Controlled by Tuning the Hydrolysis Process" J. Cryst. Growth 372 (2013) 213-218; Lee et al. "Synthesis and Photocatalytic Property of ZnO Nanoparticles Prepared by Spray-Pyrolysis Method" Phys. Procedia. 32 (2012) 320-326; Maryanti et al. "Synthesis of ZnO nanoparticles by hydrothermal method in aqueous rinds extracts of Sapindus rarak DC" Mater. Lett. 118 (2014) 96-98; Li et al. "Microwave Hydrothermal Synthesis of K Doped ZnO Nanoparticles with Enhanced Photocatalytic Properties Under Visible-Light". Mater. Lett. 118 (2014) 17-20; Omri et al. "Effects of Temperature on the Optical and Electrical Properties of ZnO Nanoparticles Synthesized by Sol-Gel Method" Microelectron. Eng. 128 (2014) 53-58; and Ba-Abbad et al. "The Effect of Process Parameters on the Size of ZnO Nanoparticles Synthesized Via the Sol-Gel Technique" J. Alloy. Compd. 550 (2013) 63-70]. The size and morphology of ZnO nanoparticles can be controlled by optimizing the temperature, pH, and reaction medium [Mallika et al. "Synthesis and Optical Characterization of Aluminium Doped ZnO Nanoparticles" Ceram. Int. 40 (2014) 12171-12177; and Niasari et al. "Nanosphericals and Nanobundles of ZnO: Synthesis and Characterization" J. Alloy. Compd. 509 (2011) 61-65].

Currently, green and environmentally friendly methods for the synthesis of nano-sized materials are highly desirable. Methods utilizing plant extracts as reducing/oxidizing agents, stabilizers, and capping agents have been proven successful in producing crystallized nanoparticles [Ghodake et al. "Pear Fruit Extract-Assisted Room-Temperature Biosynthesis of Gold Nanoplates" Colloids Surf B. 75 (2010) 584-589; and Edison et al. "Instant Green Synthesis of Silver Nanoparticles Using Terminaliachebula Fruit Extract and Evaluation of Their Catalytic Activity on Reduction of Methylene Blue" Process Biochem. 47 (2012) 1351-1357].

Single ZnO nanostructures have been shown to be marginally efficient solar photocatalyst because of high electron-hole recombination and a limited visible light-harvesting capability, which making them photoactive catalysts only in the UV region [Yuan et al. "Hetero-Nanostructured Suspended Photocatalysts for Solar-to-Fuel Conversion" Energy Environ. Sci. 7 (2014) 3934-3951; and Chen et al. "Semiconductor-Based Photocatalytic Hydrogen Generation" Chem. Rev. 110 (2010) 6503-6570]. To overcome these limitations, hybrid nanostructures made of two or more functional components have been proposed. Photocatalysts having a hetero-structure structure significantly decrease the recombination of photogenerated charge carries. In addition, such photocatalysts expand the light absorption to the visible region. Therefore, substantial enhancement of solar photocatalytic efficiency is achieved through the hetero-structured photocatalyst [Mayer et al. "Forming Heterojunctions at the Nanoscale for Improved Photoelectrochemical Water Splitting by Semiconductor Materials: Case Studies on Hematite" Acc. Chem. Res. 46 (2013) 1558-1566; Jang et al. "Heterojunction Semiconductors: A Strategy to Develop Efficient Photocatalytic Materials for Visible Light Water Splitting" Catal. Today. 185

(2012) 270-277; Wang et al. "Visible Light Driven Type II Heterostructures and Their Enhanced Photocatalysis Properties: A Review, Nanoscale" 5 (2013) 8326-8339; and Fan et al. "Semiconductor-Based Nanocomposites for Photocatalytic $H_2$ Production and $CO_2$ Conversion, Phys Chem Chem Phys. 15 (2013) 2632-2649].

Incorporation of noble metal nanoparticles/ZnO heterojunction is an efficient approach to reduce the charge carrier recombination rate and hence, enhance the photocatalytic activity. The key concept in metal-semiconductor structure is Schottky junction that is created due to the close contact of a metal and n-type semiconductor. Schottky junctions facilitate the transfer of photo-generated electrons to the contacting metal. In such process, the metal acts as an electron trap center and accelerates the separation of photo-generated charges. Thereby, a hole will have more time to react as an oxidizer on the semiconductor surface. Moreover, the metal surface provides active sites for a reduction reaction [Yang et al. "Roles of Cocatalysts in Photocatalysis and Photoelectrocatalysis" Acc. Chem. Res. 46 (2013) 1900-1909]. In this manner various noble metals have been used to construct metal-semiconductor hetero-structure such as Pt, Pd and Au [Lingampalli et al. "Highly Efficient Photocatalytic Hydrogen Generation by Solution-Processed ZnO/Pt/CdS, ZnO/Pt/Cdl-xZnxS and ZnO/Pt/CdS1-xSex Hybrid Nanostructures" Energy Environ. Sci. 6 (2013) 3589-3594; Wu et al. "Pd-Gardenia-$TiO_2$ a Photocatalyst for $H_2$ Evolution from Pure Water" Int. J. Hydrogen Energy 37 (2012) 109-114; Jin et al. "Photocatalytic Activities Enhanced for Decompositions of Organic Compounds over Metal-Photodepositing Titanium Dioxide" Chem. Eng. J. 97 (2004) 203-211; and Chiarello et al. "Photocatalytic Hydrogen Production over Flame Spray Pyrolysis-Synthesized TiO2 and Au/TiO2" Appl. Catal. B Environ. 84 (2008) 332-339].

CN106582717A discloses a method of preparing a graphene oxide-CdS—ZnO-porous silicon composite as a photocatalyst for degradation of dyes such as methyl orange. The disclosed catalyst is chemically distinct from that of the present disclosure and does not contain a noble metal, a metal oxide, and reduced graphene oxide nanoparticles.

CN103920442A discloses a photoelectric catalyst comprising a catalytic film deposited on an electrically conducting substrate. The photoelectric catalyst is a component of a device in which the catalyst is connected to a thermoelectric device having a photoconducting material. The disclosed catalytic material includes ZnO but does not disclose a photocatalyst nanocomposite comprising a noble metal, a metal oxide, and reduced graphene oxide nanoparticles.

KR1453391B1 discloses a photocatalytic method for degrading dye using a metal/metal oxide catalyst supported on carbon. The disclosed metal is gold or silver and the metal oxide is titanium dioxide, cerium dioxide, zinc oxide, or tin oxide. The disclosed carbon support is a carbon paper, a carbon cloth, a carbon felt, an activated carbon, a graphite road, or non-woven graphite. The use of a catalyst comprising a reduced graphene oxide is not described.

CN108479756A discloses a method of preparation and use of a $Bi_2WO_6$ photocatalyst. The CN108479756A catalyst is not a composite comprising a noble metal, a metal oxide, and reduced graphene.

CN106311196B discloses the preparation of tubular titanium dioxide nanoparticles and use thereof as a photocatalyst. The CN106311196B catalyst does not contain a noble metal, a metal oxide, and reduced graphene oxide.

CN103991921A discloses a floating adsorption bed comprising a photocatalytic layer, a nitrogen absorbing layer, and a magnetic dephosphorized layer supported on a substrate. The photocatalytic layer is graphene. The patent reference does not disclose and the use of a green reduced graphene oxide nanoparticles.

Soliman et al. [J. Water Proc. Engin. (2017) 245-255] disclose the preparation of activated carbon from date palm stone which is loaded with Zn(II), Cd(II), Cu(II), and Pd(II) metal ions by adsorption and ion exchange. The activated carbon displays photocatalytic activity for the degradation of crystal violet dye. The most photo-catalytically active material observed was a Zn(II)-loaded activated carbon but does not contain a noble metal, a metal oxide, and reduced graphene oxide nanoparticles.

Zayed et al. [Spectrochimica ACTA Part A: Mol. Biomol. Spect. (2014) 121, 238-244] disclose the preparation of gold nanoparticles using *Phoenix dactylifera* leaf extract. The reference does not mention nanocomposite comprising zinc oxide and reduced graphene oxide from date seed extract.

Lee et al. [Mat. Chem. Phys. (2015) https://www.sciencedirect.com/science/article/pii/S0254058415302765] disclose the preparation of a photocatalyst composite comprising gold, graphene oxide, and zinc oxide. Au/GO/ZnO. The method of preparation comprises the preparation of ZnO and gold nanoparticles separately as well as graphene oxide, and preparing a Au/GO composite followed by decorating with ZnO. The resulting photocatalyst does not contain reduced graphene oxide.

Blaisi et al. [https://app.dimensions.ai/details/publication/pub.1107476191] disclose the preparation of a composite comprising date palm ash and a MgAl-layered double hydroxide and the use thereof in the removal of methyl orange from an aqueous medium.

It is one objective of the present disclosure to provide an efficient photocatalyst nanocomposite comprising a noble metal, a metal oxide, and reduced graphene oxide prepared by a green hydrothermal method utilizing a naturally derived carbon source such as date seed extract (PDE) used as a reducing agent in a single step reaction. The photocatalyst of the invention is efficient in catalyzing the photo-decomposition of dyes in contaminated water.

SUMMARY OF THE INVENTION

A first aspect of the invention is directed to a photocatalyst nanocomposite comprising nanoparticles of a noble metal, a metal oxide, and reduced graphene oxide (rGO), wherein:
the photocatalyst nanocomposite comprises rGO in an amount in the range of 40 wt. % to 60 wt. % of the total weight of the photocatalyst nanocomposite,
the noble metal nanoparticles having a dimeter in the range of 5 nm to 50 nm are dispersed on the metal oxide nanoparticles having dimeter in the range of 20 nm to 80 nm in an amount in the range of 2 mol. % to 10 mol. % of the molar amount of the metal oxide; and
the metal oxide is an oxide of a metal selected from the group consisting of Sc, Ti, V, Cr, Mn, Fe, Co, Ni, Zn, Y, Zr, Nb, and Mo.

In a preferred embodiment, the composite comprises rGO in an amount in the range of 48 wt. % to 52 wt. % of the total weight of the nanocomposite.

In another preferred embodiment, the noble metal nanoparticles have a diameter in the range of 10-30 nm.

In another preferred embodiment, the noble metal is selected from the group consisting of ruthenium, rhodium, palladium, silver, osmium, iridium, platinum, and gold.

In a more preferred embodiment, the noble metal is gold.

In another preferred embodiment, the metal oxide is selected from the group consisting of Ti, V, M, and Zn.

In a more preferred embodiment, the metal oxide is zinc oxide.

In another more preferred embodiment, the zinc oxide is hexagonal wurtzite zinc oxide.

In another preferred embodiment, the metal oxide nanoparticles have diameter in the range of 25-50 nm.

In another preferred embodiment, the photocatalyst nanocomposite comprises about 5 mol. % of gold of the molar amount of the zinc oxide.

In some preferred embodiments, photocatalyst nanocomposite comprising gold, zinc oxide, and reduced graphene oxide nanoparticles (rGO), wherein the photocatalyst nanocomposite comprises rGO in an amount in the range of 45 wt. % to 55 wt. % of the total weight of the photocatalyst nanocomposite and the gold nanoparticles having dimeter in the range of 10 nm to 30 nm are dispersed on hexagonal wurtzite zinc oxide having dimeter in the range of 20 nm to 60 nm in an amount in the range of 2 mol. % to 10 mol. % of the amount of the zinc oxide.

In another preferred embodiment, the composite comprising gold, zinc oxide, and reduced graphene oxide nanoparticles in an amount of about 49 wt. %, 45.5 wt. %, and 5.5 wt. %, respectively, of the total weight of the composite.

Other preferred embodiments of the invention are directed to a photocatalyst nanocomposite comprising nanoparticles of a noble metal, a metal oxide, and reduced graphene oxide (rGO), wherein:

the photocatalyst nanocomposite comprises rGO in an amount in the range of 0.1 wt. % to 10 wt. % of the total weight of the photocatalyst nanocomposite, the noble metal nanoparticles having a dimeter in the range of 5 nm to 50 nm are dispersed on the metal oxide nanoparticles having dimeter in the range of 20 nm to 80 nm in an amount in the range of 2 mol. % to 10 mol. % of the molar amount of the metal oxide; and the metal oxide is an oxide of a metal selected from the group consisting of Sc, Ti, V, Cr, Mn, Fe, Co, Ni, Zn, Y, Zr, Nb, and Mo.

In a preferred embodiment, the composite comprises rGO in an amount in the range of 1.8 wt. % to 2.5 wt. % of the total weight of the nanocomposite.

In some preferred embodiments, photocatalyst nanocomposite comprising gold, zinc oxide, and reduced graphene oxide nanoparticles (rGO), wherein the photocatalyst nanocomposite comprises rGO in an amount in the range of 1.8 wt. % to 2.5 wt. % of the total weight of the photocatalyst nanocomposite and the gold nanoparticles having dimeter in the range of 10 nm to 30 nm are dispersed on hexagonal wurtzite zinc oxide having dimeter in the range of 20 nm to 60 nm in an amount in the range of 2 mol. % to 10 mol. % of the amount of the zinc oxide.

In another preferred embodiment, the composite comprising gold, zinc oxide, and reduced graphene oxide nanoparticles in an amount of about 49 wt. %, 49.1 wt. %, and 1.8 wt. %, respectively, of the total weight of the composite.

A second aspect of the invention is directed to a method of making the photocatalyst nanocomposite of the invention comprising:

preparing an aqueous suspension of metal salt, a noble metal precursor, and graphene, mixing the aqueous suspension with date seed extract to form a mixture, and heating the mixture at temperature in the range of 100-200° C. for a time in the range of 10 to 20 hours;

wherein the date seed extract is prepared by grinding date seed and heating the ground date seed in water at a temperature in the range of 60 to 100° C. for a time in the range of 1 to 5 hours and separating the solid from the liquid extract.

In a preferred embodiment, the molar amount of the noble metal precursor is in the range of 1 mol. % to 10 mol. % of the molar amount of the metal salt.

In another preferred embodiment, the metal salt is zinc acetate and the noble metal precursor is chloroauric acid ($HAuCl_4$).

In a preferred embodiment, the amount of graphene in the suspension is the range of 2 wt. % to 60 wt. % of the total weight of the photocatalyst nanocomposite.

In a preferred embodiment, the amount of graphene in the suspension is the range of 0.1 wt. % to 10 wt. % of the total weight of the photocatalyst nanocomposite.

In a preferred embodiment, the molar amount of the noble metal precursor is about 5 mol. % of the molar amount of the metal salt.

A third aspect of the invention is directed to a method of preparing a composition comprising noble metal nanoparticles comprises:

preparing an aqueous solution or suspension comprising a noble metal precursor, mixing the aqueous suspension with date seed extract to form a mixture, and heating the mixture at temperature in the range of 100-200° C. for a time in the range of 10 to 20 hours;

wherein the date seed extract is prepared by grinding date seed and heating the ground date seed in water at a temperature in the range of 60 to 100° C. for a time in the range of 1 to 5 hours and separating the solid from the liquid extract, and separating the solid from the liquid extract, and the noble metal nanoparticles have a dimeter in the range of 5 nm to 30 nm.

A fourth aspect of the invention is directed to a method of photodecomposition of an organic compound comprises:

contacting the photocatalyst nanocomposite of the invention with an aqueous solution of an organic compound to form a mixture, and irradiating the mixture with sunlight.

In a preferred embodiment, the organic compound is a dye.

In a more preferred embodiment, the dye is methyl orange.

A fifth aspect of the invention is directed to a process of purifying contaminated water with organic materials comprises:

contacting the contaminated water with the photocatalyst nanocomposite of invention, and irradiating the mixture with sunlight.

The foregoing paragraphs have been provided by way of general introduction, and are not intended to limit the scope of the following claims. The described embodiments, together with further advantages, will be best understood by reference to the following detailed description taken in conjunction with the accompanying drawings

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
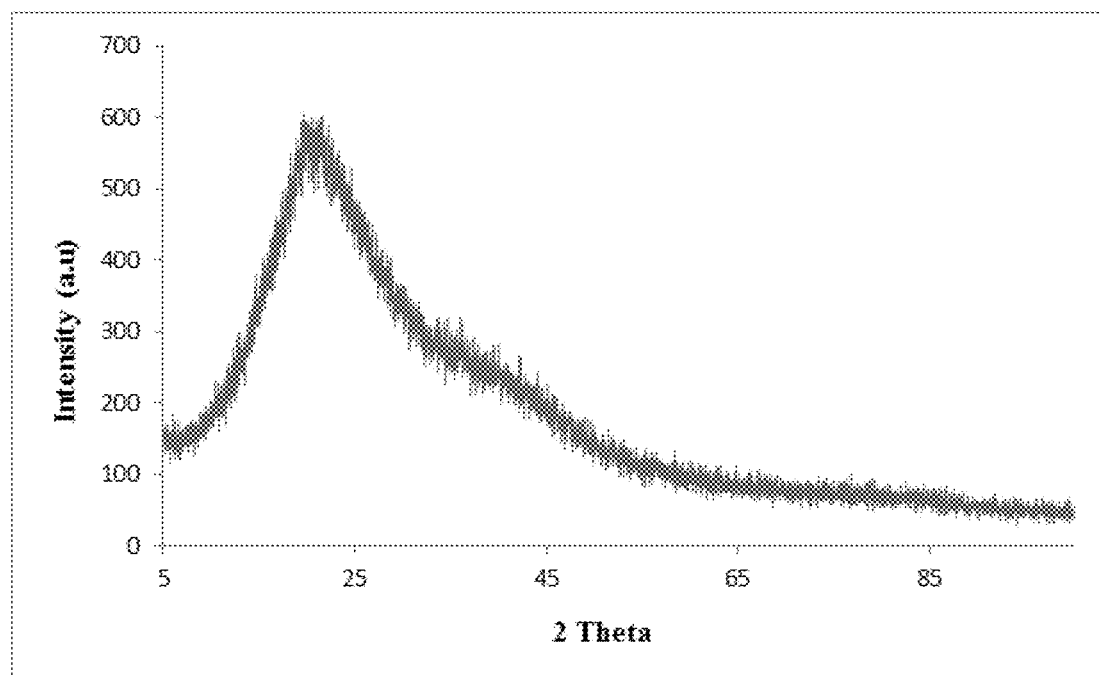
FIG. 1A shows XRD pattern of the date seed extract crystals.

Embodiments of the present disclosure will now be described more fully hereinafter with reference to the accompanying drawings, in which some, but not all embodiments of the disclosure are shown. The present disclosure will be better understood with reference to the following definitions.

All publications mentioned herein are incorporated herein by reference in full for the purpose of describing and disclosing the methodologies, which are described in the publications, which might be used in connection with the description herein. Nothing herein is to be construed as an admission that the inventors are not entitled to antedate such disclosure by virtue of prior disclosure. Also, the use of "or" means "and/or" unless stated otherwise. Similarly, "comprise," "comprises," "comprising" "include," "includes," and "including" are interchangeable and not intended to be limiting.

Unless otherwise specified, "a" or "an" means "one or more".

Terminology used herein is for the purpose of describing particular embodiments only and is not intended to be limiting of the invention.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

As used herein, the term "and/or" includes any and all combinations of one or more of the associated listed items and may be abbreviated as "/".

Links are disabled by deletion of http: or by insertion of a space or underlined space before www. In some instances, the text available via the link on the "last accessed" date may be incorporated by reference.

As used herein in the specification and claims, including as used in the examples and unless otherwise expressly specified, all numbers may be read as if prefaced by the word "substantially", "about" or "approximately," even if the term does not expressly appear. As used herein, the term "about" refers to an approximate number within 20% of a stated value, preferably within 15% of a stated value, more preferably within 10% of a stated value, and most preferably within 5% of a stated value. For example, if a stated value is about 8.0, the value may vary in the range of 8 1.6, ±1.0, 0.8, 0.5, 0.4, 0.3, 0.2, or 0.1.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it also describes subranges for Parameter X including 1-9, 1-8, 1-7, 2-9, 2-8, 2-7, 3-9, 3-8, 3-7, 2-8, 3-7, 4-6, or 7-10, 8-10 or 9-10 as mere examples. A range encompasses its endpoints as well as values inside of an endpoint, for example, the range 0-5 includes 0, >0, 1, 2, 3, 4, <5 and 5.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

A first aspect of the invention is directed to a photocatalyst nanocomposite comprising nanoparticles of a noble metal, nanoparticles of a metal oxide, and a reduced graphene oxide (rGO) support. The photocatalyst nanocomposite of the invention is prepared by a method utilizing a date seed extract as a reducing and nanoparticle size determining agent. The examples herein show that the photocatalyst nanocomposite is unexpectedly more efficient than that prepared by a conventional method.

As used herein, the term "noble metal" is a metal selected from the group consisting of ruthenium (Ru), rhodium (Rh), palladium (Pd), silver (Ag), osmium (Os), iridium (Ir), platinum (Pt), and gold (Au). The photocatalyst nanocomposite may contain nanoparticles of one or more of the noble metals such that the nanoparticles have a diameter in the range of 1-60 nm, preferably, 2-50 nm, preferably 5-40 nm, preferably 10-30 nm, preferably 15-25 nm, preferably 15-20 nm. In some embodiment of the invention, the noble metal nanoparticles are gold having a dimeter in the range of 10 nm to 30 nm, preferably, 15 nm to 25, and preferably 15 nm to 20 nm. The amount of noble metal in the nanocomposite is in the range of 1 wt. % to 15 wt. %, preferably in the range of 2 wt. % to 12 wt. %, preferably in the range of 3 wt. % to 10 wt. %, preferably in the range of 4 wt. % to 8 wt. %, and preferably in the range of 5 wt. % to 7 wt. % of the total weight of the nanocomposite.

The noble metal nanoparticles are dispersed on the metal oxide nanoparticles and the reduced graphene oxide support.

As used herein the word "diameter" refers to the average diameter of a nanoparticle measured by transmission electron microscopy (TEM.) The metal oxide nanoparticles have a diameter in the range of 20 nm to 80 nm, preferably in the range of 25 nm to 60 nm, preferably in the range of 30 nm to 40 nm. The metal oxide may be an oxide of an element such as, but not limited to, Sc, Ti, V, Cr, Mn, Fe, Co, Ni, Zn, Y, Zr, Nb, and Mo. In some preferred embodiments of the invention, the metal oxide is selected from the group consisting of Ti, V, Cr, Mn, Fe, Co, and Ni. Preferably the metal oxide is that of Zn. Zinc oxide crystallizes in two main forms, hexagonal wurtzite and cubic zinc blend. The wurtzite is the most stable and preferred form in the photocatalyst nanocomposite of the invention.

In preferred embodiments, the amount of the noble metal is in the range of 1 mole % to 15 mole %, preferably in the range of 2 mole % to 12 mole %, preferably in the range of 4 mole % to 10 mole %, preferably in the range of 5 mole % to 8 mole %, and preferably about 5.5 mol. % based on the molar amount of the metal oxide in the nanocomposite.

The photocatalyst nanocomposite of the invention comprises reduced graphene oxide in an amount in the range of 30 wt. % to 70 wt. %, preferably in the range of 35 wt. % to 65 wt. %, preferably in the range of 40 wt. % to 60 wt. %, preferably in the range of 45 wt. % to 55 wt. %, preferably in the range of 48 wt. % to 52 wt. % of the total weight of the photocatalyst nanocomposite. In a particularly preferred embodiment, the reduced graphene oxide is about 49 wt. % of the total weight of the photocatalyst nanocomposite.

In a particularly preferred embodiment, the photocatalyst nanocomposite comprises gold, zinc oxide, and reduced graphene oxide nanoparticles (rGO), wherein the photocatalyst nanocomposite comprises rGO in an amount in the range of 45 wt. % to 55 wt. %, preferably in the range of 48 wt. % 52 wt. %, preferably about 49 wt % of the total weight of the photocatalyst nanocomposite and gold nanoparticles having a diameter in the range of 5 nm to 35 nm, preferably in the range 10 nm to 30 nm, and preferably in the range of 15 nm to 20 nm which are dispersed on hexagonal wurtzite zinc oxide nanoparticles having a diameter in the range of 20 nm to 60 nm, preferably in the range of 25 nm to 50 nm, preferably in the range of 30 nm to 40 nm and the gold nanoparticles are present in an amount in the range of 2 mol. % to 10 mol. % of the molar amount of the zinc oxide.

In some other embodiments, the photocatalyst nanocomposite of the invention comprises reduced graphene oxide in an amount in the range of 0.1 wt. % to 10 wt. %, preferably in the range of 0.5 wt. % to 8 wt. %, preferably in the range of 1.0 wt. % to 6 wt. %, preferably in the range of 1.8 wt. % to 4 wt. %, preferably in the range of 2.0 wt. % to 3 wt. % of the total weight of the photocatalyst nanocomposite. In a particularly preferred embodiment, the reduced graphene oxide is about 2 wt. % of the total weight of the photocatalyst nanocomposite.

In a particularly preferred embodiment, the photocatalyst nanocomposite comprises gold, zinc oxide, and reduced graphene oxide nanoparticles (rGO), wherein the photocatalyst nanocomposite comprises rGO in an amount in the range of 1.5 wt. % to 3.0 wt. %, preferably in the range of 1.8 wt. % 2.5 wt. %, preferably about 1.9 wt % of the total weight of the photocatalyst nanocomposite and gold nanoparticles having a diameter in the range of 5 nm to 35 nm, preferably in the range 10 nm to 30 nm, and preferably in the range of 15 nm to 20 nm which are dispersed on hexagonal wurtzite zinc oxide nanoparticles having a diameter in the range of 20 nm to 60 nm, preferably in the range of 25 nm to 50 nm, preferably in the range of 30 nm to 40 nm and the gold nanoparticles are present in an amount in the range of 2 mol. % to 10 mol. % of the molar amount of the zinc oxide.

The second aspect of the invention is directed to a method of preparing a noble metal nanoparticle or composite thereof such as, but not limited to the photocatalyst nanocomposite of the invention. The method comprises:

preparing a mixture of an aqueous solution or suspension comprising a noble metal precursor and date seed extract, and heating the mixture at temperature in the range of 100-200° C. for a time in the range of 5 to 30 hours.

Any date seed from any location may be utilized in obtaining the date seed extract. The date seed extract is prepared from seeds by washing with water, drying, and grinding the date seed to a fine powder. The seed powder is suspended in water in an amount in the range 50 to 500 g/L, preferably 100 to 400 g/L, preferably 250-350 g/L, and preferably about 300 g/L. The date seed powder suspension is heated at a temperature in the range of 60-100° C., preferably in the range of 70-90° C., preferably about 80° C. for a time in the range 5-50 h, preferably 10-30 hours, preferably about 15 h. The suspension is filtered to remove the solid material and the filtrate is refrigerated at about 4° C. until used.

The noble metal precursor may be any salt or compound of a noble metal such as but not limited to $AuF_3$, $AuF_5$, $(AuCl_3)_2$, $Au_4Cl_8$, AuBr, $AuBr_3$, AuI, AuI3, $Au_2O_3$, $Au_2S$, $Au_2S_3$, $HAuCl_4$, $PtCl_2$, $PtCl_4$, $PtF_4$, $PtO_2$, $H_2PtCl_6$, palladium halide including but not limited to $PdF_2$, $PdF_3$, $PdF_4$, $PdF_6$, $Pd(PdF_6)$, palladium acetate, palladium acetylacetonate, $PdCl_2$, $PdBr_2$, palladium cyanide, $Pd(NO_3)_2$, $Ag_2CO_3$, $AgF_2$, $AgNO_3$, silver acetate, $OsO_4$, $OsO_2$, $RuO_2$, $RuO_4$, $K_2RuO_4$, $RuCl_3$, $RuF_3$, $RhCl_3$, $RhF_6$, $RhO_2$, $Na_2RhO_3$, $IrO_2$, $Ir_2O_3$, $IrO_4$, $IrCl_2$, $IrCl_3$, and the like.

In some embodiments of the method, the mixture further comprises graphene oxide and a metal salt as defined herein above to produce the photocatalyst of the invention. Any suitable metal salt such as that of, but not limited to, Sc, Ti, V, Cr, Mn, Fe, Co, Ni, Zn, Y, Zr, Nb, and Mo may be utilized. Examples of the salts include, but are not limited to halides, carboxylate, carbonate, alkoxide and the like such as, but not limited to $ZnCl_2$, $ZnBr_2$, zinc acetate, zinc isoprpoxide, $Zn(OCH_3)_2$, titanium isopropoxide, $ZrCl_4$, $Zr_4(OC_2H_5)_{16}$, $FeCl_2$, $FeCl_3$, $TiCl_4$, $Ti_4(OC_2H_5)_{16}$, $VCl_3$, $VBr_3$, vanadium acetate, vanadium oxytriisopropoxide, $MnCl_2$, $MnBr_2$, manganese acetate, and the like.

The amount of the noble metal in the suspension is in the range of 1 mole % to 15 mole %, preferably in the range of 2 mole % to 12 mole %, preferably in the range of 4 mole % to 10 mole %, and preferably in the range of 5 mole % to 8 mole % of the metal oxide in the nanocomposite. The amount of graphene oxide in the suspension is in the range of 30 wt. % to 70 wt. %, preferably in the range of 35 wt. % to 65 wt. %, preferably in the range of 40 wt. % to 60 wt. %, preferably in the range of 45 wt. % to 55 wt. %, preferably in the range of 48 wt. % to 52 wt. % of the total weight of the noble metal, metal oxide, and graphene oxide. In some other embodiments, the amount of graphene oxide in the suspension is in the range of 0.1 wt. % to 10 wt. %, preferably in the range of 0.5 wt. % to 8 wt. %, preferably in the range of 1.0 wt. % to 6 wt. %, preferably in the range of 1.8 wt. % to 4 wt. %, preferably in the range of 2.0 wt. % to 3 wt. % of the total weight of the noble metal, metal oxide, and graphene oxide.

The mixture is heated at a temperature in the range of 100-200° C., preferably in the range of 110-180° C., preferably in the range of 120-160° C., preferably at about 150° C. for a time in the range of 10 to 20 hours for a time in the range of 10 to 20 hours for a time in the range of 5 to 30 hours, preferably in the range of 10 to 25 hours, preferably, about 15 hours. The noble metal nanoparticles or nanocomposite are filtered, washed, and dried at a temperature in the range of 50-120° C., preferably 60-100° C., and preferably 70-80° C.

Another aspect of the invention is directed to a method of photodecomposition of organic compounds comprising contacting the photocatalyst of the invention with an aqueous solution of the organic compounds and irradiating the solution with sunlight for a time required for the decomposition of the organic material. The photochemical decomposition reaction may be monitored by well-known methods such as UV-Vis spectroscopy, HPLC, visual photo-bleaching of the aqueous solution, and the like. In some embodiments of the method, the organic compound is a dye such as but not limited to methyl orange, methylene blue, indigo, tyrian purple, and the like that contaminate water. The photocatalyst of the invention is an effective catalyst for the decomposition of such dyes by sunlight. The irradiation time required for the decomposition of a dye in water varies with the chemical structure of the dye. In some embodiments, it is at least 0.5 h, 1.0, h, 1.5 h, 2.0 h, 2.5 h, 3.0 h, 3.5 h, 4.0 h, 4.5 h, and 5.0.

A photodecomposition step can be incorporated as step in a process of partially or fully purifying contaminated water with water soluble organic compounds such as dyes for human and animal consumption or releasing the water into the environment. The contaminated water may be obtained from any industrial source such as, but not limited to chemical plants, textile manufacturing plants, petrochemical plants, sewage plant, rain runoff, and the like. The process may include, but not limited to filtration, a photodecomposition step, and desalination steps.

Example 1

Preparation of Date Seed Extract:

The date seeds were collected from Al-Hasa city (Saudi Arabia). Washed and dried seeds were grinded using automatic grinder. Fine date seed powder (30 g) was suspended in 100 ml distilled water and the resulted date seed suspension was heated and stirred for 3 hrs. at 80° C. The resulted date extract suspension was then filtered to remove the solid particles and then stored and refrigerated.

Figure 1B:
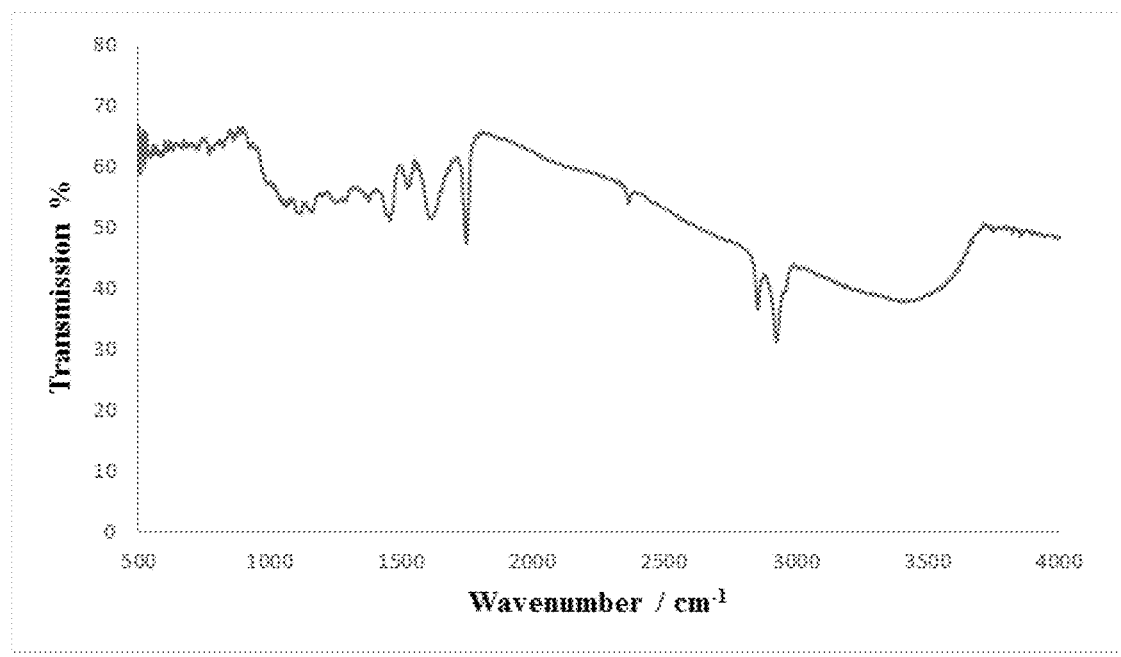
FIG. 1B shows FTIR spectrum of the date seed extract crystals.
Figure 2:
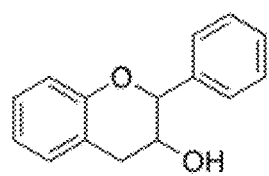
FIG. 2 shows examples of the chemical structures of flavonoids and polyphenolic compounds in date seed extract.
Figure 2:
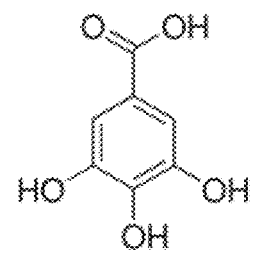
Figure 2:
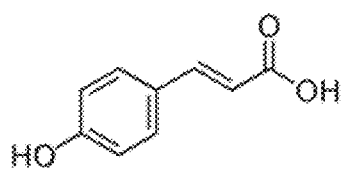
Figure 2:
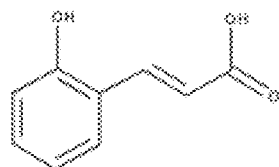

The solid date seed extract was obtained by evaporating water from the prepared aqueous date seed extract using rotary evaporator at 20 mbar at 25° C. Shiny red crystals were obtained after water evaporation. The XRD and FTIR of the as obtained date extract crystals was measured. FIG. 1A shows the XRD pattern of the date extract crystals. Sharp band at 19.7° is observed which might be resulted from some bioorganic compounds present in the date seed extract. FIG. 1B shows FTIR spectrum of the seed extract. The peak at 3391.9 $cm^{-1}$ can be attributed to stretching vibration of O—H/N—H groups. The peaks at ~2925 $cm^{-1}$ are due to C—H stretching vibration. The presence of peaks at 1612 and 1745 $cm^{-1}$ may be assigned to aromatic C=C stretching vibration. It is known that date seed extract is rich in bioactive flavonoids and polyphenolic compounds such as, but not limited to hydroxycinnamic acids, flavonols, flavones, gallic acid, and flavan-3-ols (FIG. 2).

Example 2

Synthesis of Au/ZnO/rGO:

Graphene oxide was prepared performing modified Hummers method [Hummers et al. "Preparation of Graphitic Oxide" J. Amer. Chem. Soc. 80 (1958) 1339-1339, incorporated herein by reference in its entirety]. Au/ZnO/rGO was synthesized by dissolving 5.0 g zinc acetate dihydrate (99% purity) in 100 mL of an aqueous suspension of GO (2 mole % of the molar amount of zinc acetate). 5 mole % of chloroauric acid (HAuCl$_4$) of the molar amount zinc acetate was dissolved in the zinc acetate solution and further stirred for 30 min. Date seed extract (50 ml) was added drop-wise to the above solution with stirring and allowed to stir for 1 h. The resulted suspension was transferred into an autoclave and heated at 150° C. for 15 h. The water was evaporated using rotary evaporator at 20 mbar at 25° C. and dried in oven at 70° C. for 3 h. The resulting residue was washed and calcined at 400° C. for 30 min to ensure the removal of any remaining organic materials. ZnO/rGO nanocomposite was prepared by the same method without adding auric acid. Moreover, pure ZnO nanoparticles were synthesized by a similar process but in absence of GO and auric acid. In order to compare the effect of date seed (DS) extract, all nanomaterials were prepared in absence of DS extract using NaOH. The samples have been denoted as Z, ZG, AZG, respectively, for ZnO, ZnO/rGO, Au/ZnO/rGO, respectively, prepared in the absence of DSE and Z DS, ZG DS, AZG DS, respectively, for ZnO, ZnO/rGO, Au/ZnO/rGO, respectively, prepared in the presence of DSE. The prepared particles were characterized by XRD, Raman, SEM and TEM and EDX.

Example 3

Characterization of ZnO. ZnO/rGO and Au/ZnO/rGO Composites:

XRD measurements were performed using a Cu—K x-ray and 40 kV. FTIR measurements were recorded on IRAFFINITY-1 Shimadzu's. Scanning electron microscopy (SEM) images were taken using Hitachi S-4700. Transmission electron microscopy (TEM) analysis was performed on a Jeol JEM 2100 at 200 KV. Samples were mounted on 300 mesh Copper Grids coated with holey Carbon film (AGAR C062/C). A single drop was placed on the grid and blotted from the underside to leave the particles on the grid. Samples were allowed to air dry for 24 hours prior to analysis. EDX analysis was performed using an Oxford Instruments X-maxn 80 and analyzed using Aztec software.

Figure 3A:
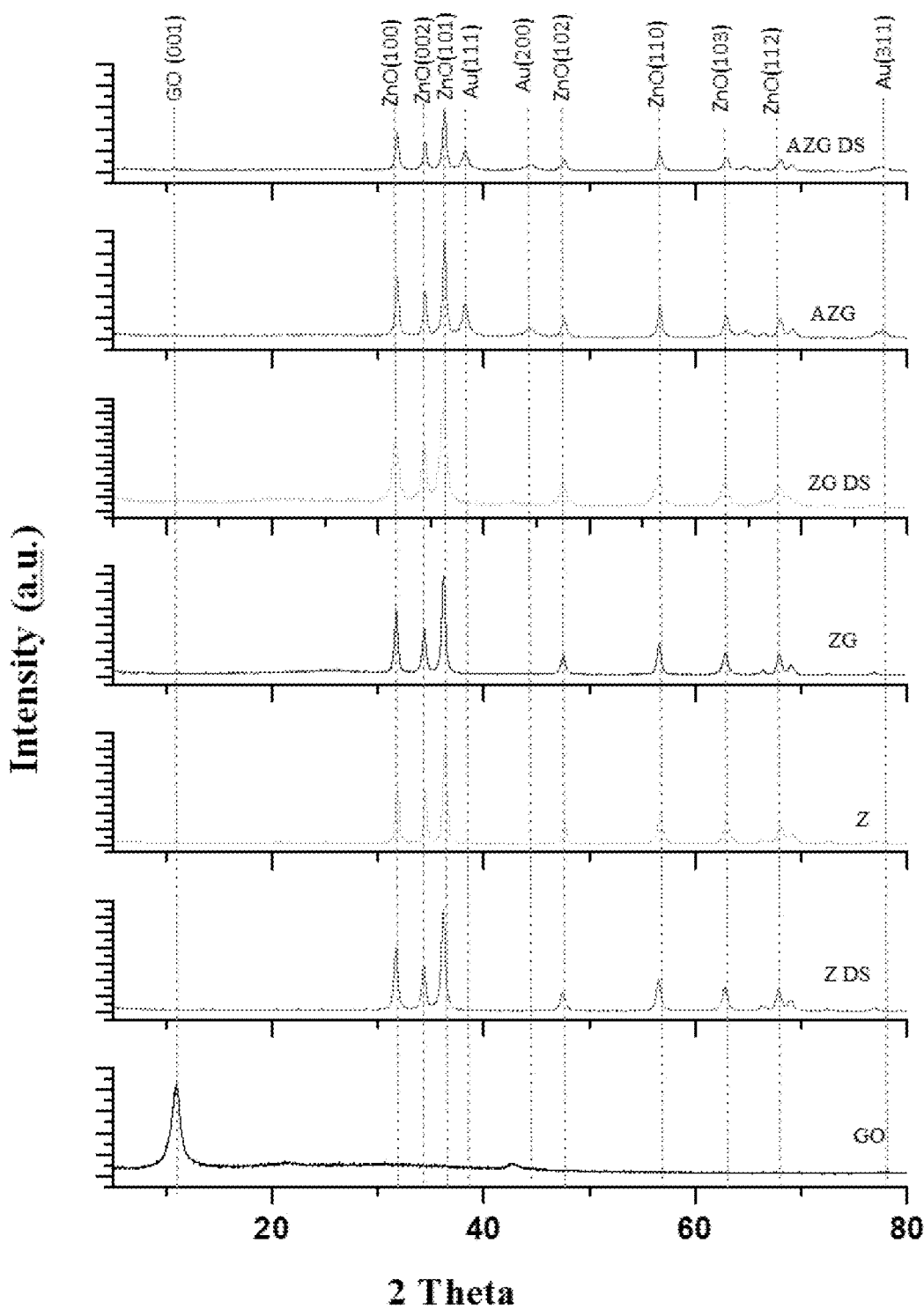
FIG. 3A compares the XRD patterns of GO, ZnO (Z), ZnO/rGO (ZG) and Au/ZnO/rGO (AZG) nanocomposites prepared in the presence of date seed extract (DSE).
Figure 3B:
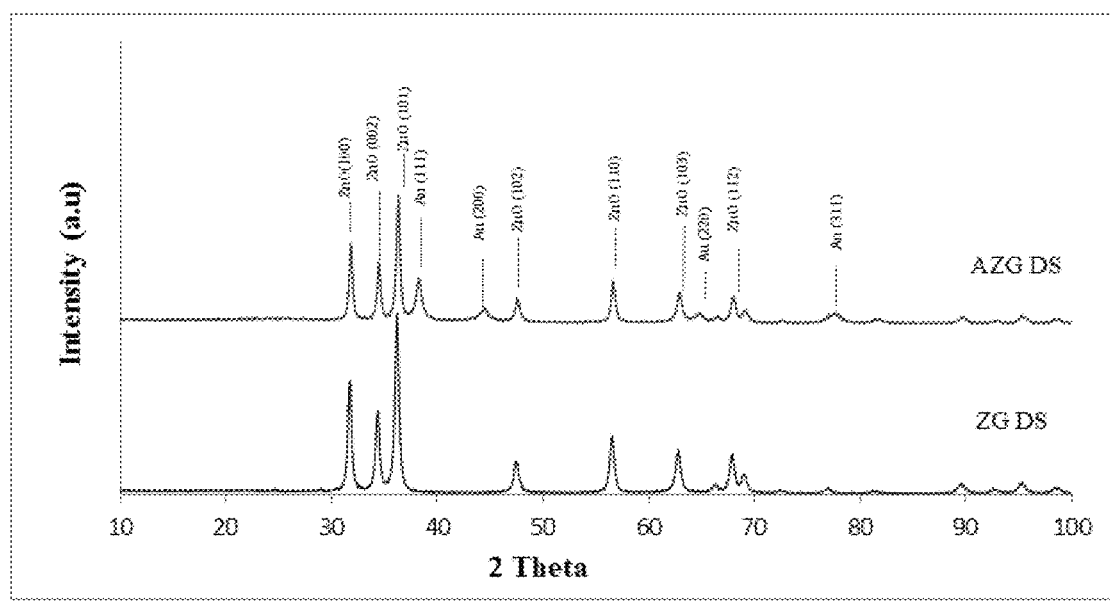
FIG. 3B compare are the XRD patterns of ZnO/rGO (ZG) and Au/ZnO/rGO (AZG) nanocomposites in the absence of DSE.

XRD patterns of the nanocomposites are shown in FIGS. 3A and B. The XRD pattern of GO shows 2θ band at 10.8°, which is assigned to GO. The XRD pattern of ZnO and ZnO/rGO nanocomposite prepared in the absence of DSE (Z and ZG) and in the presence of DSE (Z DS and ZG DS) show the characteristic diffraction peaks at 2θ=31.7, 34.29, 36.21, 47.48, 56.53, 62.7, 66.30, 67.86, 69.00, 72.46, 76.86 are attributed to [100], [022], [101], [102], [110], [103], [200], [112], [201], [004] and [202] planes, respectively, assigned to the crystal planes of wurtzite hexagonal phase ZnO (JPCDS 36-1451). The XRD pattern of Au/ZnO/rGO nanocomposites either in the absence or in the presence of DSE (i.e., AZG and AZG DS, respectively) exhibits four identical diffraction peaks at 2θ=38.2°, 44.5°, 65.6° and 78.6°, respectively, which are corresponding to the [111], [200], [220] and [311] respectively, of metal gold, respectively, (ICDD No. 4-0783), in addition to the diffraction peaks for ZnO. Lower intensities of the peaks are observed for the samples prepared in the presence of DSE. The observed variation in the peak intensities of XRD patterns may be due to difference in the particle size distribution in different samples. The two different set of diffractions observed due to presence of ZnO and Au in AZG and AZG DS samples which indicating the formation of composite system with successful loading of Au nanoparticles. Furthermore, the characteristic diffraction peaks at 2θ=10.10 for GO in ZG, ZG DS, AZG and AZG DS were not observed, indicating the transformation of GO to rGO sheets after hydrothermal reduction in presence of NaOH or date seed extract (DSE), with random packaging [Zhang et al. "Graphene transforms wide band gap ZnS to a visible light photocatalyst. The new role of graphene as a macromolecular photosensitizer" Acs Nano. 6 (2012) 9777-9789].

Figure 4:
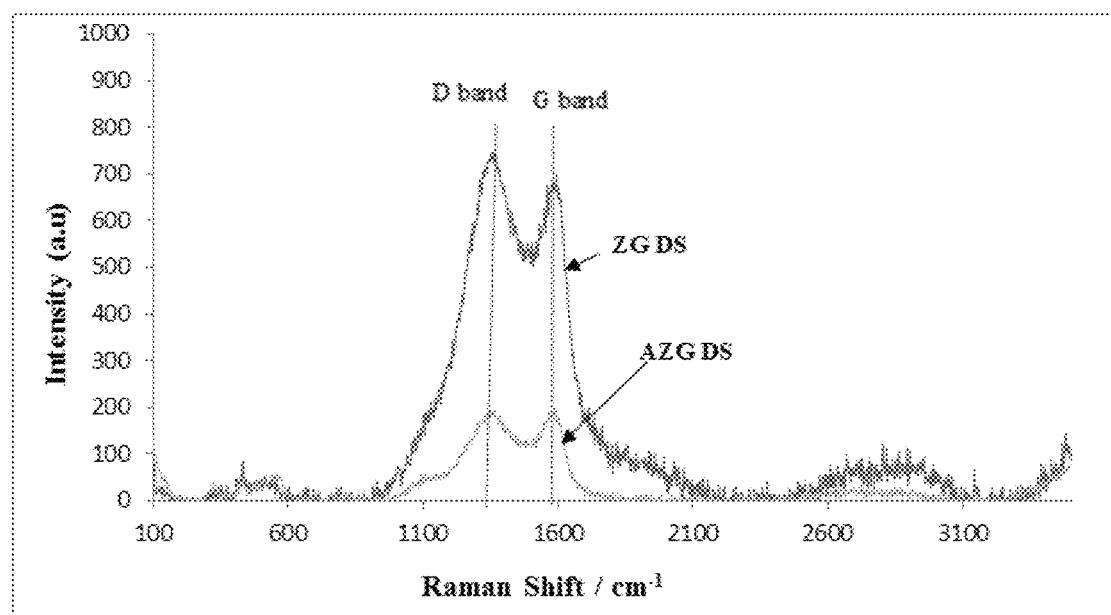
FIG. 4 shows Raman Spectra of ZnO/rGO (ZG) and Au/ZnO/rGO (AZG) nanocomposites prepared in the presence of DSE.

Raman spectra of ZnO/rGO (ZG) and Au/ZnO/rGO nanocomposites (AZG) are shown in FIG. 4. Week bands at 363, 434 and 533 cm$^{-1}$ are observed which are assigned to ZnO nanoparticles. The band at 363 cm$^{-1}$ is generated from second-order Raman spectrum arising from zone boundary phonons of hexagonal ZnO. The band at 434 cm$^{-1}$ is assigned to non-polar optical phonon $E_2$ (HI) vibration mode of ZnO in wurtzite structure and at 584 cm$^{-1}$ corresponds to the $E_1$ (LO) mode of hexagonal ZnO, which is associated with the oxygen deficiencies [Li et al. "Physical and Electrical Performance of Vapor-Solid Grown ZnO Straight Nanowires" Nanoscale Res. Lett. 4 (2009) 165-168]. Both spectra show the D and G bands of graphitic carbon at 1340 and 1610 cm$^{-1}$ respectively arises from the defects created by the attachment of oxygen containing functional groups on the graphene's basal plane and G band assigns to the first-order scattering of the $E_{2g}$ mode [Alomair et al. "Green synthesis of ZnO hollow microspheres and ZnO/rGO nanocomposite using red rice husk extract and their photocatalytic performance" Mater. Res. Express 5 (2018) 095012]. No bands assigned for Au nanoparticles have been observed under the applied experimental conditions.

Figure 5A:
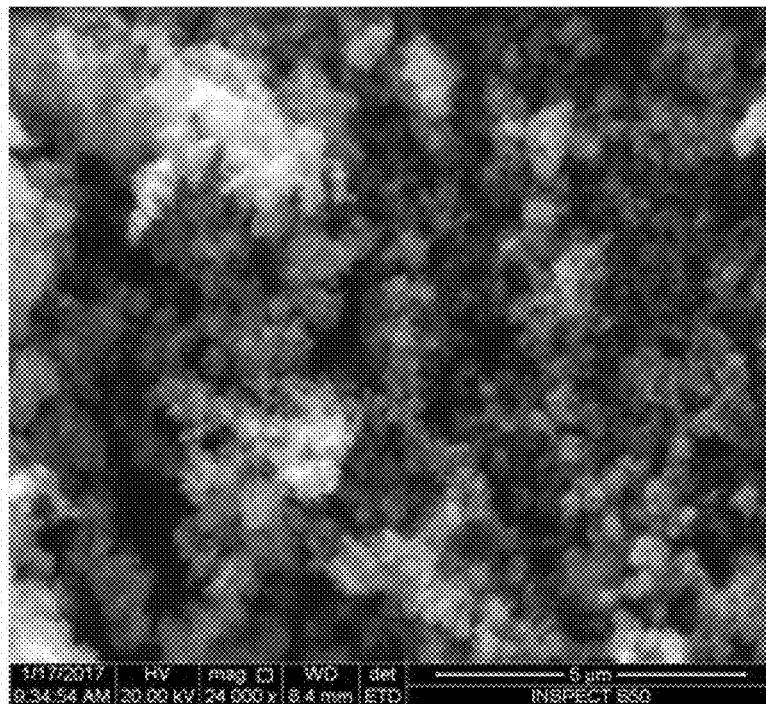
FIG. 5A shows a SEM image of ZnO/rGO nanocomposites.
Figure 5B:
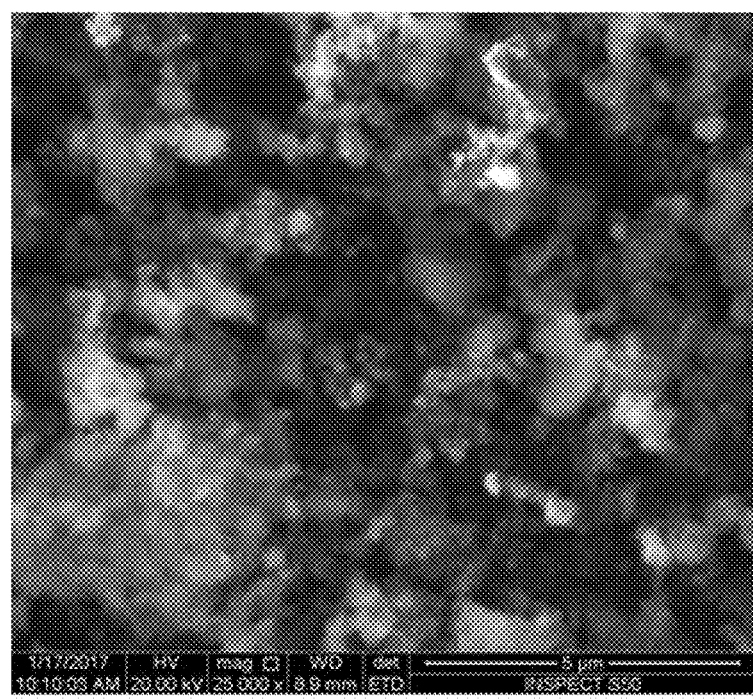
FIG. 5B shows a SEM image of Au/ZnO/rGO nanocomposites.
Figure 6A:
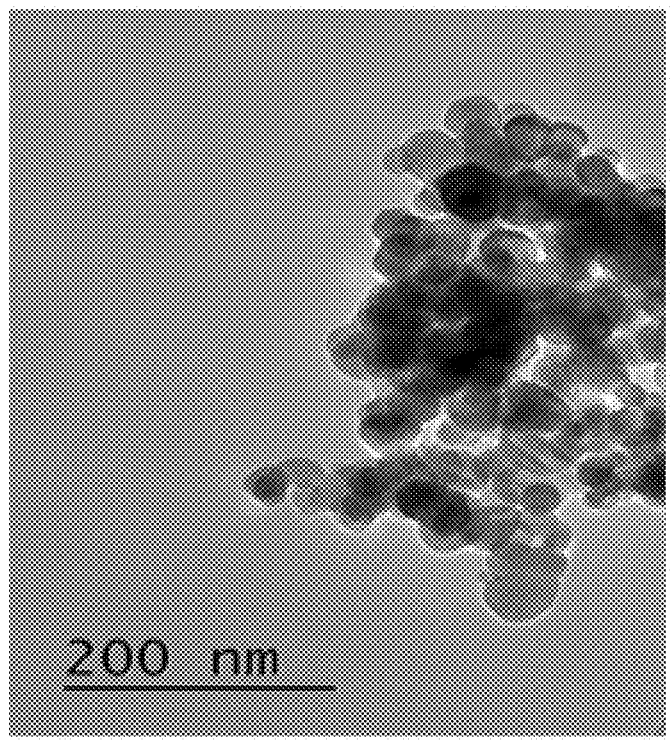
FIG. 6A shows TEM images of ZnO at 1× magnification prepared in the presence of DSE.
Figure 6B:
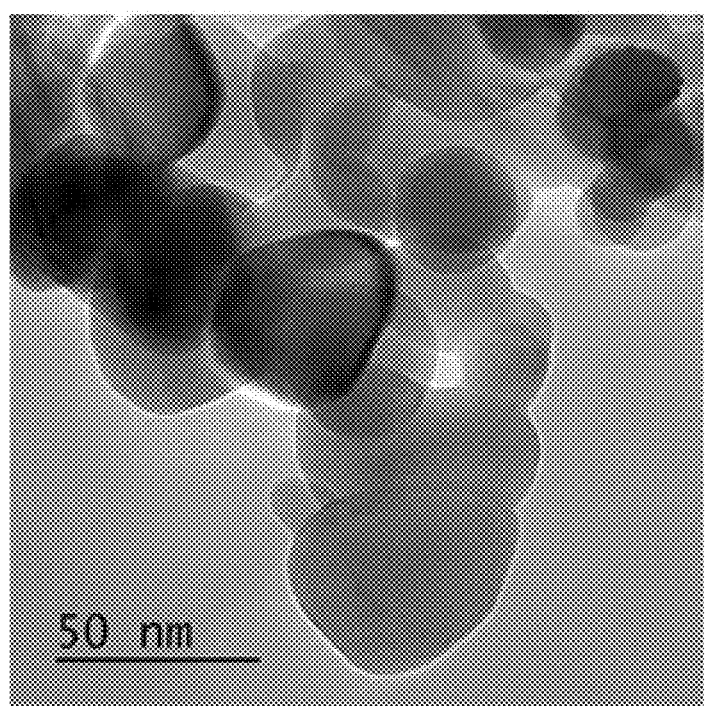
FIG. 6B shows TEM images of ZnO at 4× magnification prepared in the presence of DSE.
Figure 6C:
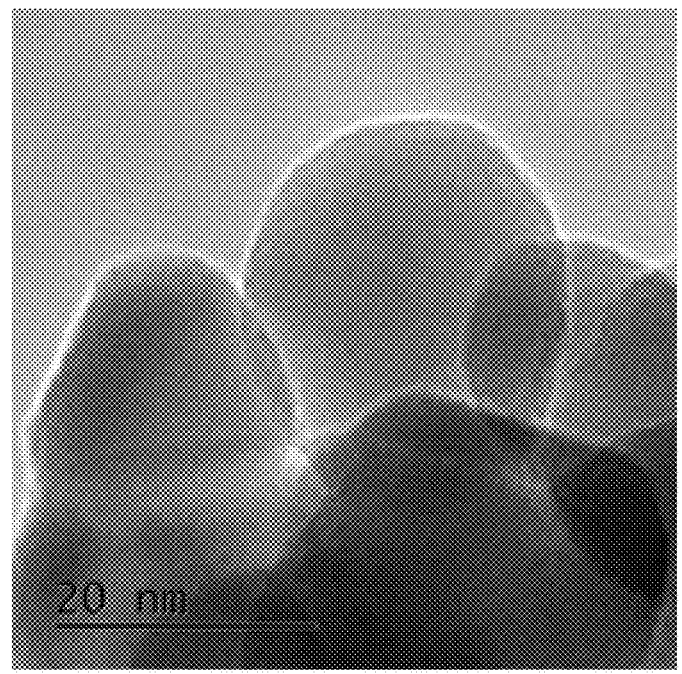
FIG. 6C shows TEM images of ZnO at 10× magnification prepared in the presence of DSE.
Figure 6D:
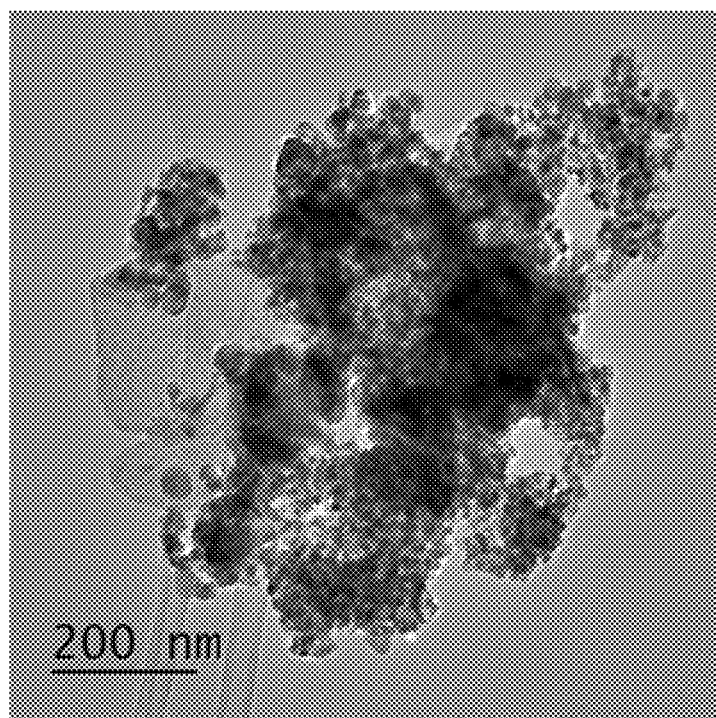
FIG. 6D shows TEM images of ZnO/rGO at 1× magnification prepared in the presence of DSE.
Figure 6E:
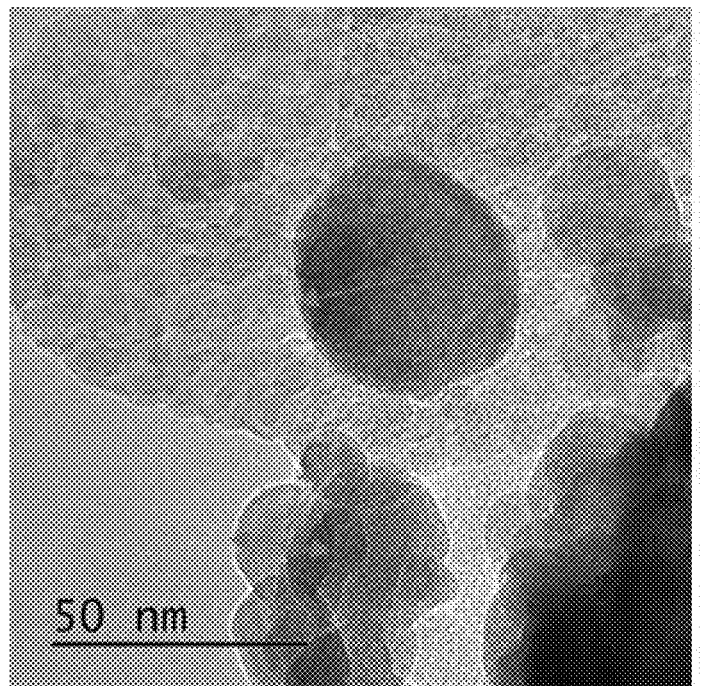
FIG. 6E shows TEM images of ZnO/rGO at 4× magnification prepared in the presence of DSE.
Figure 6F:
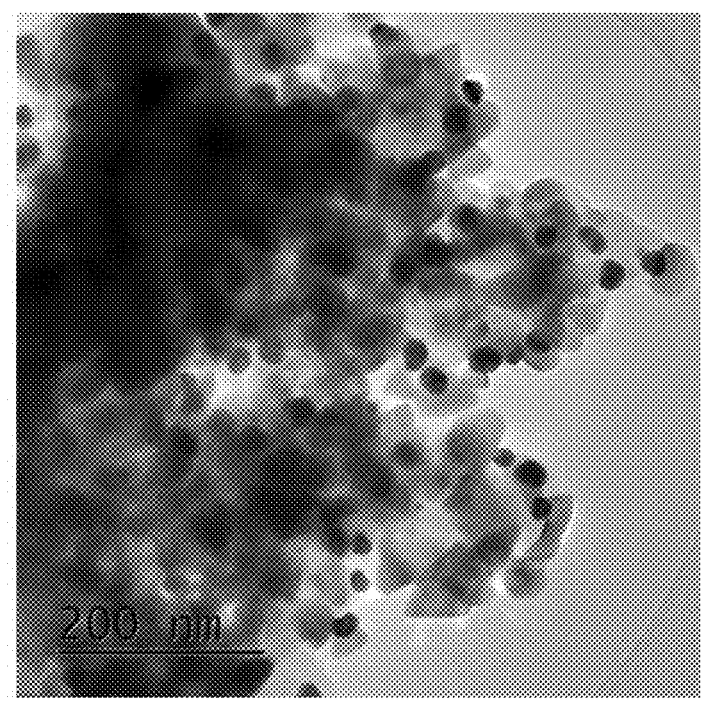
FIG. 6F shows TEM images of pure Au/ZnO/rGO nanocomposites at IX magnification prepared in the presence of DSE.
Figure 6G:
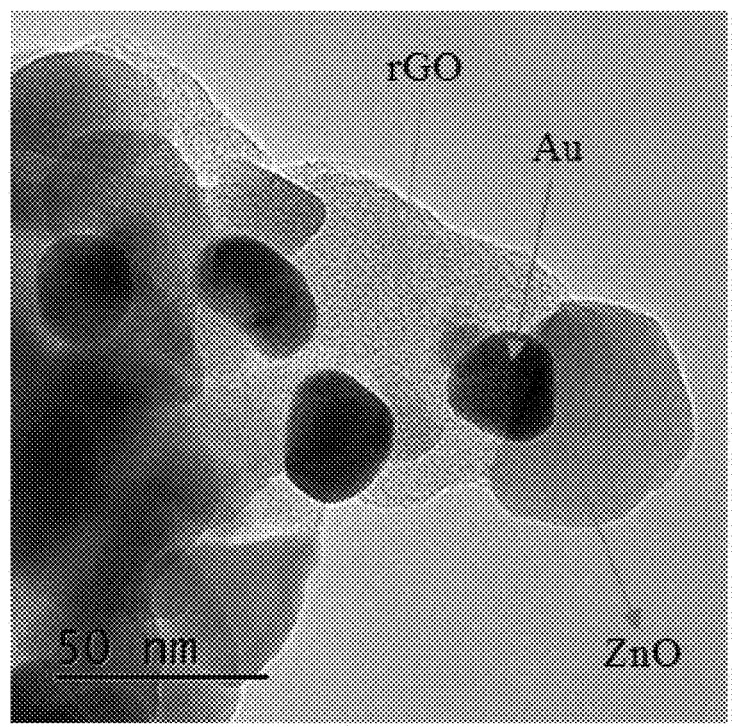
FIG. 6G shows TEM images of Au/ZnO/rGO nanocomposites at 4× magnification prepared in the presence of DSE.
Figure 6H:
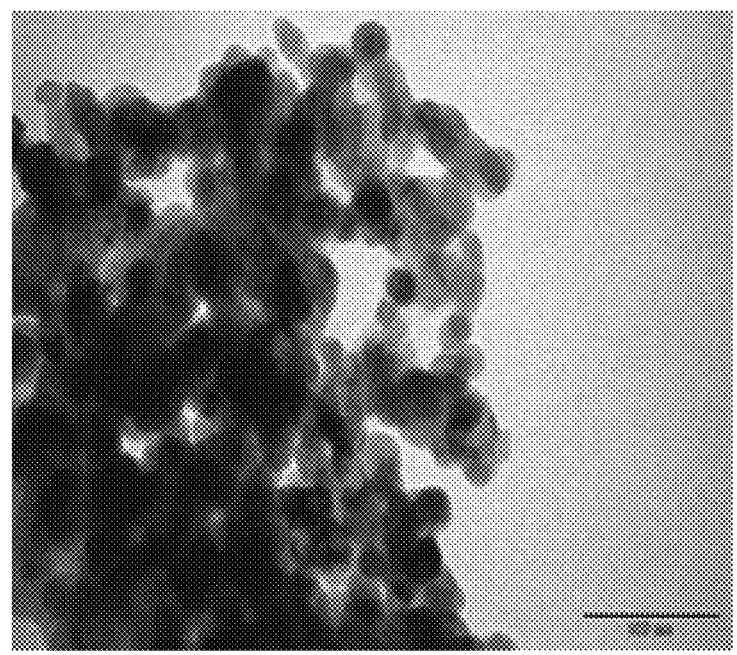
FIG. 6H shows TEM images of ZnO at 2× magnification prepared in absence of DSE.
Figure 6I:
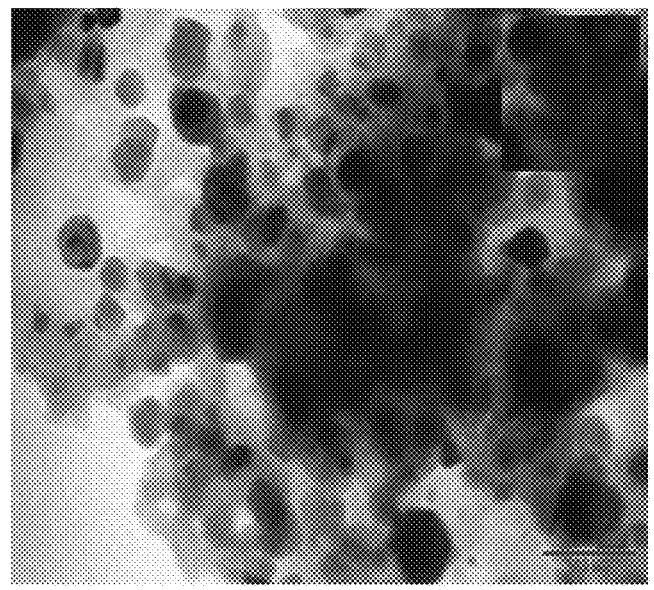
FIG. 6I shows TEM images of ZnO/rGO at 2× magnification prepared in absence of DSE.
Figure 6J:
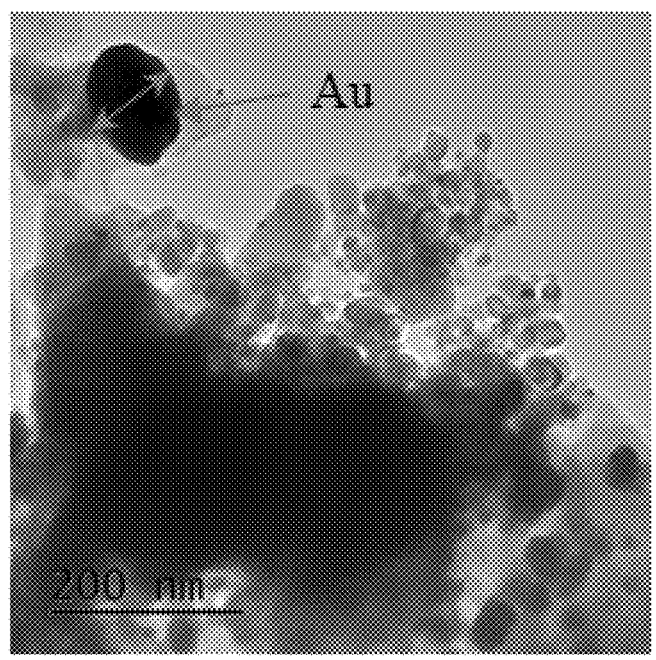
FIG. 6J shows TEM images of Au/ZnO/rGO at 4× magnification prepared in absence of DSE.

The SEM images of ZnO/rGO and Au/ZnO/rGO show agglomeration of ZnO particles on rGO support (FIGS. 5A and 5B). The nanocomposite materials morphology, composition and dimensions were determined from TEM measurements (FIGS. 6A-6J). TEM images of ZnO prepared in the presence of DSE (Z DS) are shown in FIGS. 6A-6C and show particles of ZnO with size in the ranging of 30 to 40 nm. TEM images of ZnO/rGO nanocomposite (ZG DS) of FIGS. 6D and 6E show ZnO particulates with size ranging from 30 to 40 nm anchored on the surface of the reduced graphene oxide. Au nanoparticles with an average size 15-20 nm are homogeneously well distributed on the surfaces of ZnO nanoparticles and rGO sheets, see FIGS. 6F and 6G. In comparison, the nanomaterials prepared in the absence of DSE showing the formation of larger Au nanoparticles with the size in range 40-60 nm disorderly distributed on the ZnO. The results indicate the role of DSE as both stabilizing and reducing agent for the synthesis of the nanoparticle as well as in controlling the shape and size nanoparticles.

Figure 7A:
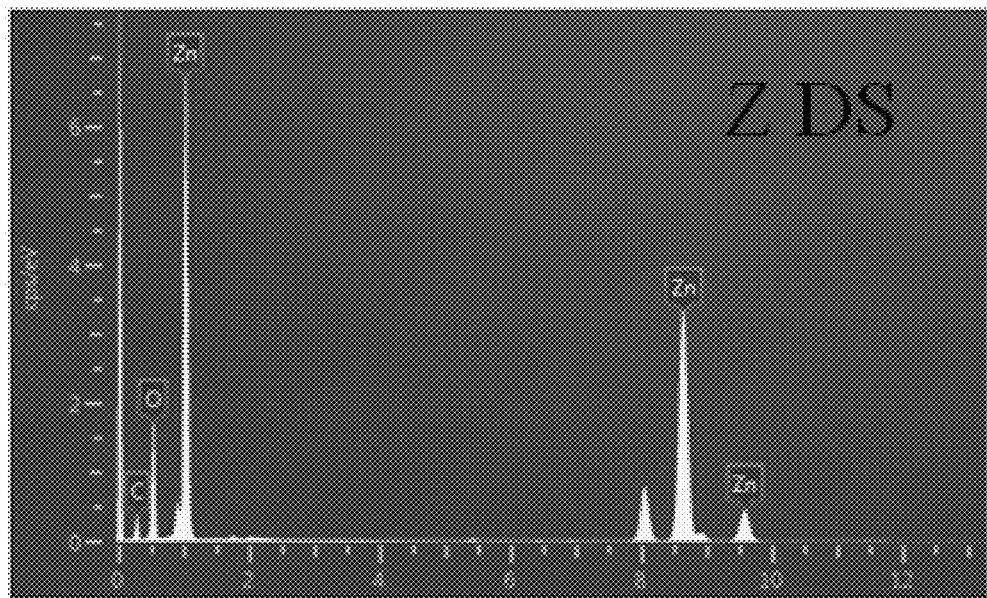
FIG. 7A shows EDX analysis of ZnO (Z DS) prepared in the presence of DSE.
Figure 7B:
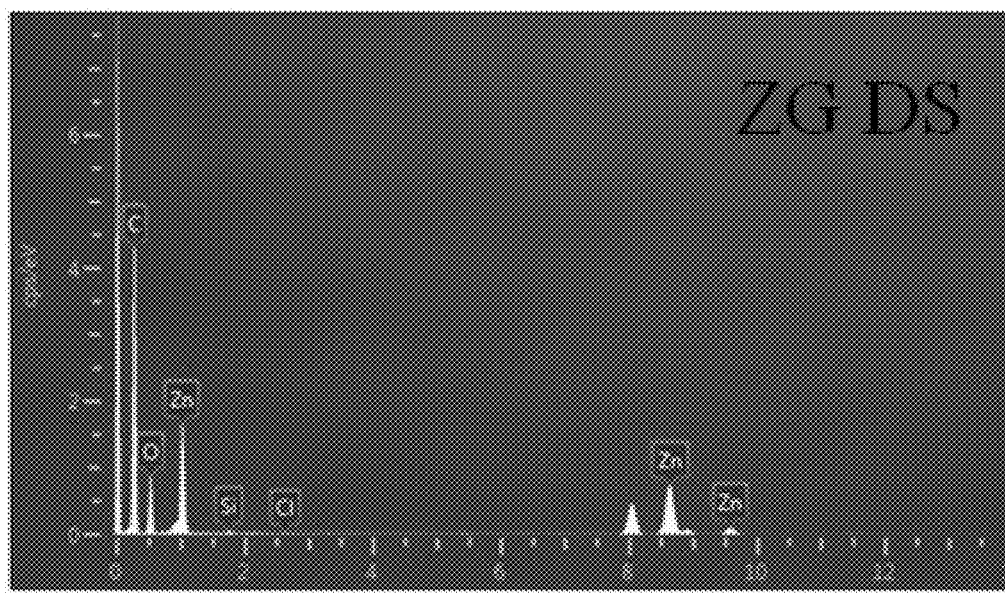
FIG. 7B shows EDX analysis of ZnO/rGO (ZG DS) prepared in presence of DSE.
Figure 7C:
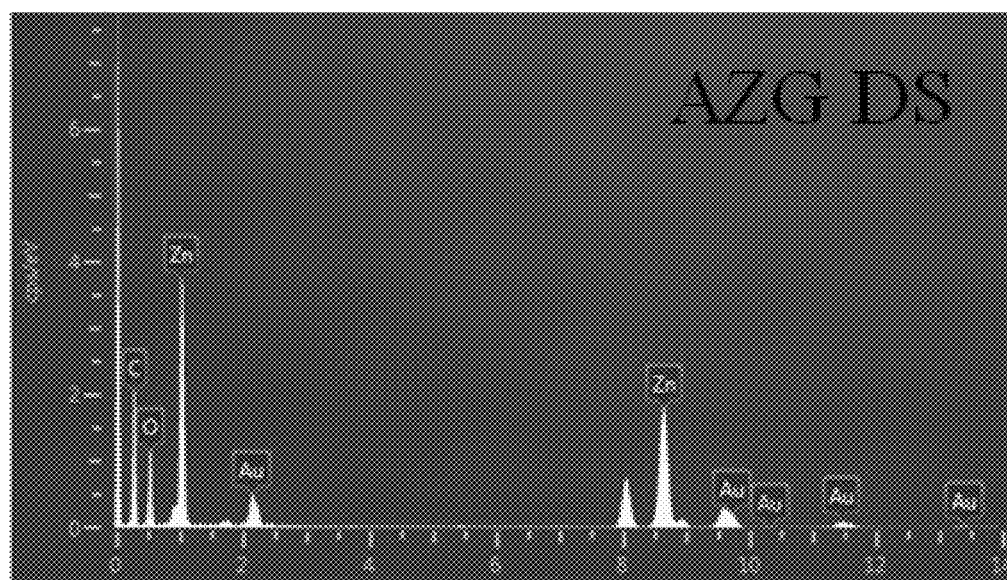
FIG. 7C shows EDX analysis of Au/ZnO/rGO nanocomposites (AZG DS) prepared in the presence of DSE.

The energy-dispersive x-ray spectroscopy (EDX) analyses are shown in FIGS. 7A-7C. The EDX spectrum of ZnO shown in FIG. 7A confirms the presence of Zn and oxygen, while the EDX of ZnO/rGO shown in FIG. 7B confirms the presence of oxygen and Zn in addition to carbon. The Au peak has been observed along with the Zn, O and C peaks in the Au/ZnO/rGO nanocomposite in the EDX spectrum shown in FIG. 7C.

Example 4

Photocatalytic activity:

The photocatalytic performance of the green synthesized ZnO, ZnO/rGO and Au/ZnO/rGO nanocomposites have been evaluated for the degradation of the organic dye Methyl Orange (MO) as a model of water pollutant. The photocatalytic experiments were carried out using sunlight simulating lamp (PT2192, 125 W). Photocatalyst (1 g/L) was dispersed in 100 ml followed by dissolving 20 ppm of MO dye. The resulting suspension was kept in the dark for 30 min under stirring to achieve equilibrium. The suspension was irradiated and liquid samples were taken before and during the irradiation and filtered to remove the solid catalyst. The degradation efficiency of the green synthesized nanomaterials was defined in terms of the $C/C_0$ ratio, where $C_0$ and $C$ represent the initial concentrations of the dye and the concentration of the dye at time t, respectively. Also, the photocatalytic activities of the nanomaterials prepared in the absence of DSE have been investigated for comparison.

Figure 8A:
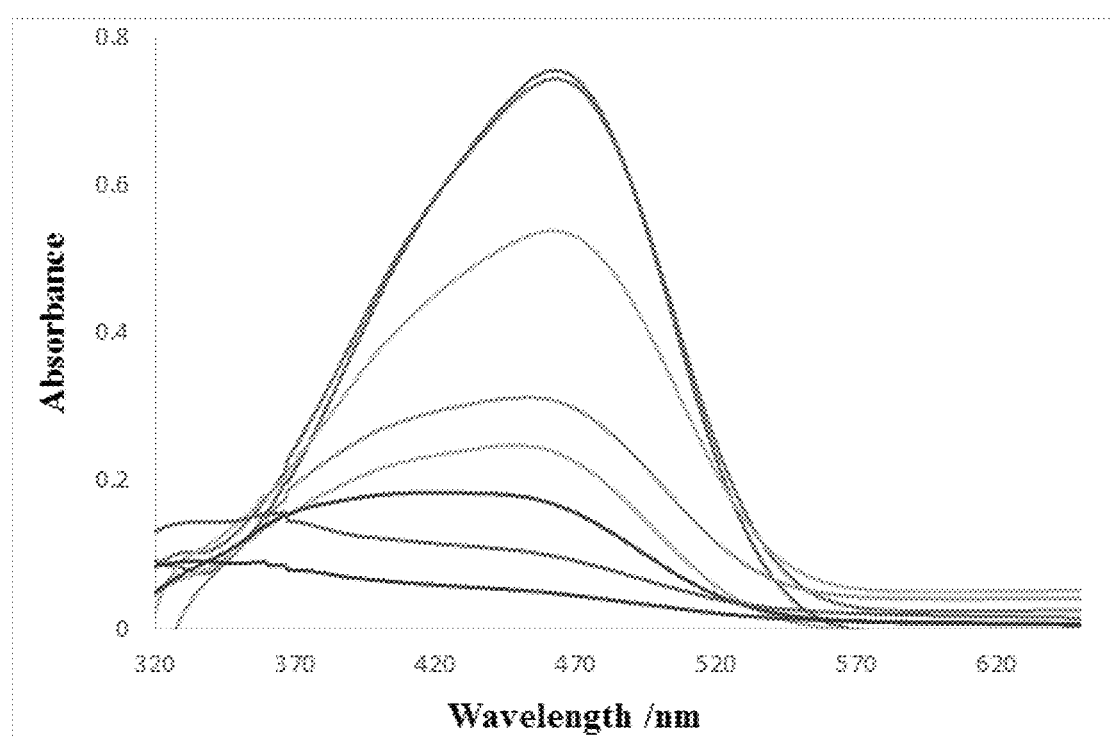
FIG. 8A shows a time dependent UV-vis absorption spectra of an aqueous solution of MO dye during irradiation in the presence of Au/ZnO/rGO.
Figure 8B:
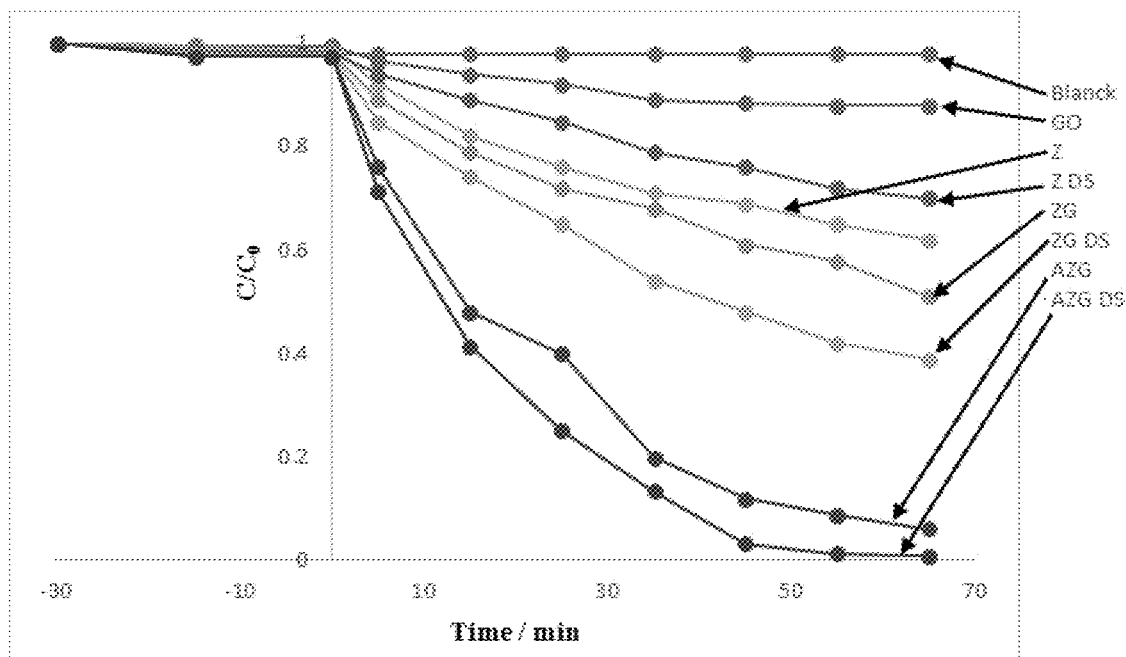
FIG. 8B shows time dependent photocatalytic degradation of MO as a function of time at pH 5.0 using different nanomaterial photocatalysts.

The nanocomposite of Au/ZnO/rGO (both AZG and AZG DS) exhibit superior photocatalytic activity compared to ZnO/rGO (either ZG or ZG DS). FIG. 8A shows UV-vis absorption spectral change of MO dye in the presence of AZG and FIG. 8B shows the time course of MO degradation catalyzed by the nanomaterials described herein. MO dye alone exhibits very slow degradation by visible light, while faster degradation rates were observed when ZnO nanoparticles prepared in the presence and absence of DSE as a catalyst are used. In the presence of ZnO/rGO (ZG DS), more efficient degradations have been achieved, resulting in the degradation of about 54% of MO dye in only 65 min. In contrast, about 95% of MO dye is degraded in the presence of Au/ZnO/rGO (AZG DS) nanoparticles. The enhancement of the visible light photocatalytic activity due to the embedded Au nanoparticles in ZnO/rGO is readily attributed to the combination of sensitization of ZnO nanoparticles induced by the embedded Au nanoparticles and the synergetic effect between ZnO/rGO and Au nanoparticles. Such a combination enhances the electron-hole pair separation. The side-by-side comparison the photocatalytic activities of nanoparticles prepared in the presence of DSE and sodium hydroxide in the photodegradation of MO has unexpectedly indicated that nanoparticles prepared in the presence of DSE are more efficient catalyst than those prepared in the presence of sodium hydroxide. Such an unexpected observation may be attributed to the larger and non-uniform distribution of the nanoparticles in the composite produced with sodium hydroxide.

Figure 9:
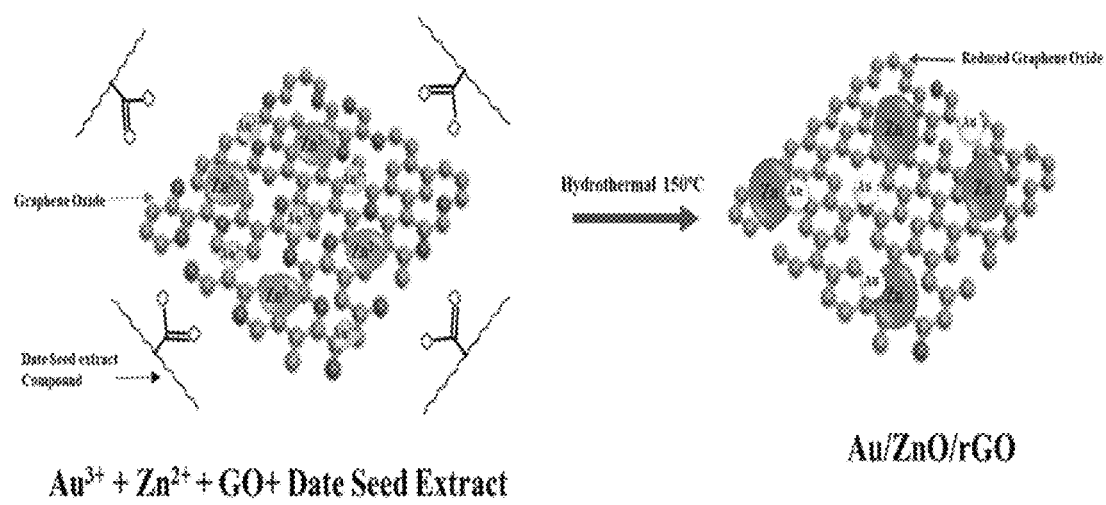
FIG. 9 shows a schematic representation of single step green synthesis of Au/ZnO/rGO nanocomposite.
Figure 10:
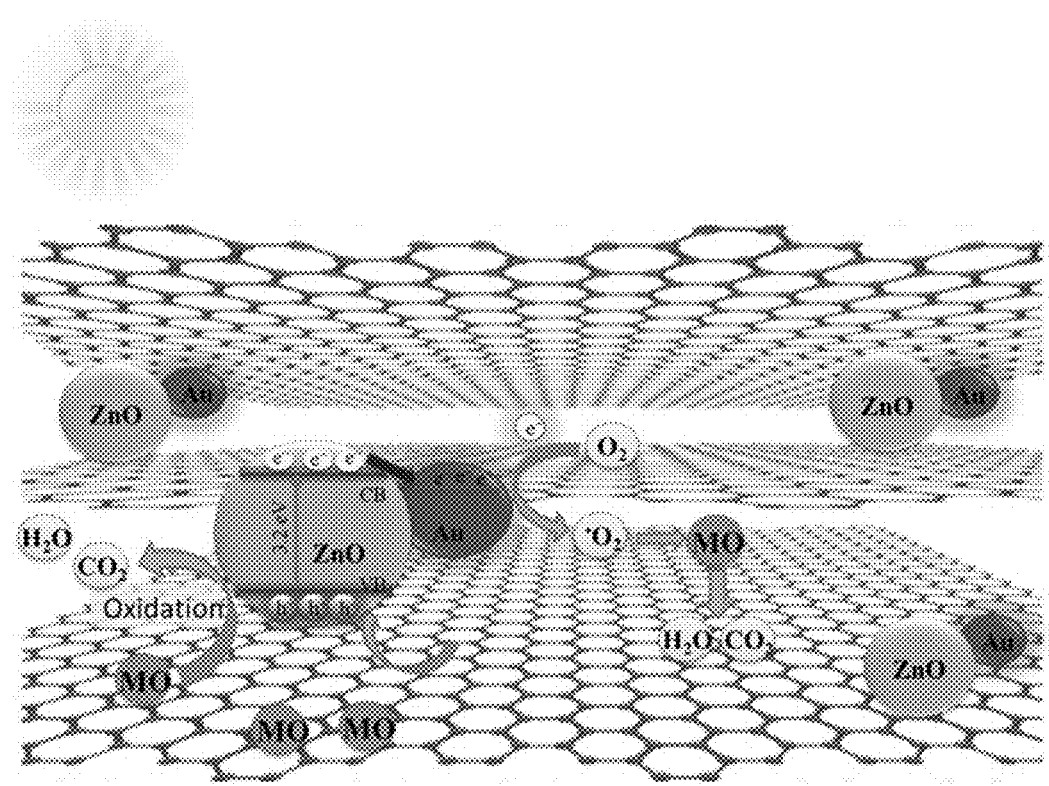
FIG. 10 shows schematic representation of single step green synthesis of Au/ZnO/rGO Nanocomposite.

A schematic representation of a single step green synthesis of Au/ZnO/rGO is shown in FIG. 9. ZnO/rGO and Au/ZnO/rGO nanocomposites have been synthesized by the single step green method using Zinc acetate as Zn (II) ions source. Reduction of GO and formation of ZnO nanoparticles was achieved simultaneously. When Au (III) ions are present in the synthesis, they are also reduced to Au atoms and deposited on the surface of ZnO and/or rGO forming Au/ZnO/rGO. Such a mechanism is supported by the TEM measurements and observation. Furthermore, the proposed mechanism of the effective photocatalytic oxidation of methyl orange on Au/ZnO/rGO nanocomposite is illustrated in FIG. 10. Au/ZnO/rGO nanocomposite show higher activity compared to ZnO/rGO, which may be owing to the visible light sensitization of ZnO induced by the surface plasmon absorption of the embedded Au nanoparticles. The coupling of Au nanoparticles and ZnO/rGO produces an enhancement of the charge carrier separation and thus, enhancement of the overall photocatalytic activity.

The invention claimed is:

1. Extraction method of making a gold/zinc/graphene oxide photocatalyst nanocomposite comprising:
preparing a date seed extract suspension by grinding a date seed and heating the ground date seed in water at a temperature in the range of 60 to 100° C. for a time in the range of 1 to 5 hours to form an extract suspension mixture,
separating solids from the extract suspension mixture to form an extract mixture, then
evaporating water from the extract mixture to obtain crystals the date seed extract,
preparing an aqueous suspension of zinc acetate, chloroauric acid, and graphene oxide,
mixing the aqueous suspension with the date seed extract to form a mixture, and
heating the mixture at temperature in the range of 100-200° C. for a time in the range of 10 to 20 hours to form the gold/zinc/graphene oxide photocatalyst nanocomposite;
wherein the gold/zinc/graphene oxide photocatalyst nanocomposite comprises Au nanoparticles, hexagonal wurtzite ZnO, and reduced graphene oxide (rGO); wherein the Au nanoparticles are present in an amount of 2 mol. % to 10 mol. % based on the molar amount of the ZnO nanoparticles and the rGO is present in an amount of 40 wt. % to 60 wt. % of the total weight of the gold/zinc/graphene oxide photocatalyst nanocomposite,
wherein the Au nanoparticles have a diameter in the range of 15 to 20 nm and are homogeneously distributed on the ZnO nanoparticles and on the rGO: the ZnO nanoparticles have a diameter in the range of 30 to 40 nm and are present on the rGO.

2. The method of claim 1, wherein the gold/zinc/graphene oxide photocatalyst composite comprises rGO in an amount in the range of 48 wt. % to 52 wt. % of the total weight of the nanocomposite.

3. The method of claim 1, wherein the gold/zinc/graphene oxide photocatalyst nanocomposite comprises 5 mol. % of Au based on the molar amount of the ZnO.

* * * * *